United States Patent [19]

Fong

[11] Patent Number: 5,124,210
[45] Date of Patent: Jun. 23, 1992

[54] SUBSTRATE COATED WITH ONE PART MOISTURE CURABLE URETHANE COMPOSITION

[75] Inventor: James J. J. Fong, St. Paul, Minn.

[73] Assignee: Minnesota Mining and Manufacturing Company, St. Paul, Minn.

[21] Appl. No.: 607,897

[22] Filed: Nov. 1, 1990

Related U.S. Application Data

[60] Continuation-in-part of Ser. No. 285,650, Dec. 16, 1988, abandoned, which is a division of Ser. No. 90,859, Aug. 28, 1987, Pat. No. 4,839,455.

[51] Int. Cl.⁵ ............................................. B32B 27/40
[52] U.S. Cl. ................................. 428/425.1; 428/425.5
[58] Field of Search ....................... 428/425.5, 425.1; 524/869, 453; 528/28

[56] References Cited

U.S. PATENT DOCUMENTS

| | | | |
|---|---|---|---|
| 4,217,436 | 8/1980 | Richter et al. | 528/45 |
| 4,222,909 | 9/1980 | Brixius et al. | 260/18 TN |
| 4,289,869 | 9/1981 | Zengel et al. | 529/83 |
| 4,507,447 | 3/1985 | Yamazaki et al. | 525/528 |
| 4,539,345 | 9/1985 | Hansen | 523/219 |
| 4,565,857 | 1/1986 | Grant | 527/301 |
| 4,600,790 | 7/1986 | Eck et al. | 556/421 |
| 4,625,012 | 11/1986 | Risk et al. | 528/20 |

FOREIGN PATENT DOCUMENTS 0789549 12/1980 U.S.S.R.

Primary Examiner—John C. Bleutge
Assistant Examiner—R. Dean, Jr.
Attorney, Agent, or Firm—Gary L. Griswold; Walter N. Kirn; Richard Francis

[57] ABSTRACT

The present invention relates to an article (e.g., of wood) coated with a one-part, moisture-curable, urethane composition. The composition comprises trisocyanate prepolymer, an epoxy silane, and compatible solvent.

8 Claims, No Drawings

SUBSTRATE COATED WITH ONE PART MOISTURE CURABLE URETHANE COMPOSITION

BACKGROUND OF THE INVENTION

This is a Continuation-in-Part application of U.S. Ser. No. 07/285,650, filed Dec. 16, 1988, now abandoned which is a Division of U.S. Ser. No. 07/090,859, filed Aug. 28, 1987, and issued Jun. 13, 1989 as U.S. Pat. No. 4,839,455.

This invention relates to a one-part moisture-curable urethane protective coating composition and to substrates such as wood coated therewith.

Coatings containing polyurethane are very popular because they provide a clear coating on wood which has flexibility, toughness, abrasion resistance, and chemical resistance. The polyurethane coating may be either a two-component or a one-component system. The two-component systems are generally inconvenient to use because they have a short pot life and are difficult to apply. The use of two-component systems as a wood finish is thus generally limited to professionals.

The one-component, moisture-cureable polyurethane systems are well known as clear wood finishes. One type, the isocyanate modified drying oil or urethane oil, depends for its final curing upon the oxidative polymerization of double bonds of the drying oil fatty acid portion. Another type, the so-called blocked isocyanate coating system, involves the heat curing of an end-capped isocyanate which is blocked by phenol or ketoxime that is curable with a polyol via thermal regeneration of the isocyanate.

U.S. Pat. No. 4,222,909, issued to D. W. Brixius et al, discloses a moisture curable coating composition comprising low molecular weight isocyanate functional acrylic polymer having a terminal thioalkyl group based on the copolymerized isocyanatoalkyl methacrylate. U.S. Pat. No 4,217,436, issued to Richter et al, discloses the use of a novel bis cyclic urea blend with polymeric polyols to form one-component room temperature stable curable composition. The bis cyclic urea is easily converted to aliphatic diisocyanate simply by heating. U.S. Pat. No. 4,565,857, issued to Grant, discloses a protective coating system comprising a polymerizable ethylenically unsaturated compound having an isocyanate group reacted with the hydroxyl groups of the cellulose ester. This thermoplastic polymer can be coated on a wood surface by conventional methods and, following a final cure, thermoset by exposure to ultra violet light. U.S. Pat. No. 4,600,790, issued to Eck et al discloses a moisture curable composition containing SiC-bonded biuret groups, which is prepared by reacting amino functional silane with mono or diisocyanates, that serves as an additive to lacquers. U.S. Pat. No. 4,289,869, issued to Zengel et al, describes a moisture curable mixture containing polyisocyanate and polyepoxide with an N,N'-substituted imiazolidine or hexahydropyrimidine derivative as a moisture activated hardener. U.S. Pat. No. 4,625,012, issued to Risk et al, discloses the preparation of a moisture curable polyurethane polymer containing terminal isocyanate and alkoxysilane by a two-step reaction route, to provide a sealing material for non-porous surfaces such as glass and ceramic. U.S. Pat. No. 4,539,345, issued to Hansen, teaches one-part moisture-curable polyurethane adhesive, coating, sealant, or casting compositions based on a blend of isocyanate-functional prepolymer, terpene-phenolic resin, and a silane compound.

The polyurethane coating compositions disclosed in the cited prior art have problems or disadvantages. For example, the cellulose-type urethane coatings lack the ability to provide heat and stain resistance, oil-type urethane systems require the use of heat and UV radiation for curing, polymerizable isocyanate-silane polymers have a relatively short pot life due to high molecular weight, and some coatings are complicated to use and/or are relatively expensive to prepare because they use sophisticated materials. Many of these disadvantages can be overcome by the present invention.

SUMMARY OF THE INVENTION

The present invention provides a substrate coated with a one-part, moisture-curable composition that comprises triisocyanate prepolymer, an amount of epoxy silane effective to crosslink the prepolymer, and sufficient compatible liquid vehicle to make the composition suitable for application. Preferred prepolymers are selected from the group consisting of a reaction product of a diisocyanate and a triol and 1,3,5-triazine. The diisocyanate may be aromatic or aliphatic, but is preferably aliphatic, if yellowing associated with the aromatic is a concern. Blends of triisocyanate prepolymer with diisocyanate prepolymer are also preferred since the presence in the coating of diisocyanate tends to enhance the flexibility of the cured coating. Preferred prepolymer blends may be obtained by reaction of diisocyanate with trimethylol propane and 1,3-butandiol. Preferred isocyanates are toluene 2,4-diisocyanate and aliphatic isophorone diisocyanate.

The epoxy silanes used in the present invention are characterized by having a silicon atom having trialkoxy functionality and an epoxy group. Such epoxy silanes are very stable, even when mixed with the isocyanate prepolymer, so long as the other components are free of active hydrogen atoms. The epoxy silane is thought to hydrolyze to hydroxy and then crosslink with triisocyanate to form a coating. Preferred epoxy silanes are selected from the group consisting of gamma glycidoxypropyltrimethoxy silane and beta-(3,4-epoxycylohexyl)ethyltrimethyloxy silane.

The composition of the invention may include a catalyst to accelerate cure time, but such catalysts are not required since the cure times of compositions without the catalyst are quite adequate for most applications. Useful catalysts include stannous octoate and dibutyl tin dilaurate. Any compatible liquid vehicle may be used in the practice of the invention. Useful liquid vehicles are solvents which are free of active hydrogen atoms and moisture.

The composition of the invention may be used by a method which has the following steps:

(a) preparing the surface of a substrate surface for treatment, if needed, usually by conventional methods;

(b) applying the composition to the surface; and (c) subjecting the coating applied in (b) to conditions which facilitate the cure of the composition.

Application may be by any of a variety of methods such as brushing, spraying and wiping. Since the composition has a high solids content and low viscosity it may be easily applied in a "wipe-on" application to wood surfaces as a very quick, convenient, and precise method preferred by the do-it-yourself consumer.

This invention provides many advantageous features. It provides a coating composition which has an extremely stable shelf-life, low viscosity and high solids content to facilitate easy application. The coating exhibits excellent hardness, good adhesion to wood surfaces and other non-porous or porous surfaces such as ceramic, cement, etc., good stain and chemical resistance, and heat resistance.

The coating composition of the invention is particularly useful to treat wood in the consumer market to provide a clear finish. The composition of the present invention provides considerable improvement over commercially available products which are based upon cellulose, urethane oil and thermoplastic urethane. The present composition also has excellent penetration into the pores of wood and other porous materials and develops excellent bonding with wood cellulose and other surfaces. Once treated, a wood surface is provided with an excellent durable finish, highlighting the wood grain. The treated wood surface feels waxy and smooth, but not greasy. The treated surface is easy to clean, and has a high resistance to food stains, household chemicals, and damage caused by contact with hot items.

The applied composition typically exhibits high gloss, but it may be altered by the addition of conventional flattening agents. Pigment such as dried $TiO_2$, ZnS, can also be added to provide a sealant that bonds well to ceramic, glass and concrete surfaces.

The composition also has a shorter drying time to a sandable condition than other known commercial products which allows users to apply multiple coatings within a shorter time. The applied composition has excellent weatherability, showing less discoloration as well as less wood grain raising.

The composition may include a pigment or a colorant such as a wood stain which may be blended therein or may be coreactive with the coating composition to provide a one-part coating which provides a substrate with a protective coating and a desired colored or stained surface finish.

DESCRIPTION OF THE INVENTION

In the practice of the present invention, the moisture curable compositions can be reacted with atmospheric or added moisture to produce a crosslinked polyurethane coating or sealant. The triisocyanate-functional prepolymer (hereafter sometimes referred to as the "prepolymer") contains sufficient isocyanate groups to enable the composition to be crosslinked by the epoxy silane upon exposure to atmospheric or added moisture.

The amount of silane compound preferably is adjusted to provide desired handling characteristics before cure and a desired level of adhesion (measured initially and after exposure to environmental conditions) after cure. This amount will vary depending upon the particular prepolymer employed, the other ingredients present in the composition, and the substrate and environmental conditions with which the composition will be used. In general, an effective amount of silane compound is an amount which will provide coherent protective coating of the composition when it is applied to a substrate with substantially no unreacted starting materials.

Expressed numerically, a preferred amount of silane compound is about 0.1 to 25 parts by weight of silane compound per 100 parts of prepolymer, more preferably about one to 10 parts of silane compound per 100 parts of prepolymer.

The triisocyanate prepolymers used in the present invention are commercially available from National Lead Chemicals, Highstown, N.J. The compositions and the structures of these prepolymers are described as follows:

where A is a backbone consisting of at least three $-CH_2O-$ groups derived from polyhydric alcohols, such as glycerol, trimethylol propane, pentaerythritol, dipentaerythritol, sorbitol, or inositol. B is a moiety consisting of urethane (—COHN—) linkage to an aliphatic or aromatic segment, e.g., derived from diisocyanates such as cyclohexyl diisocyanate, isophorone diisocyanate, hexamethylene diisocyanate, if aliphatic, and 2,4,toluene diisocyanate, 4,4'-diphenylmethane diisocyanate, 4,6'-xylylene diisocyanate, if aromatic.

The prepolymer is usually prepared as a solution with a suitable solvent. Some examples of useful prepolymer solutions include the following. It should be noted that the solids content and the particular solvent is given for illustrative purposes and both the solids content and the solvent may be changed depending upon the needs of the user.

Prepolymer Solution A

This is a solution of an aromatic prepolymer which is a reaction product of trimethylol propane (TMP) with 3 moles of toluene diisocyanate (TDI). The isocyanate prepolymer structure is as follows:

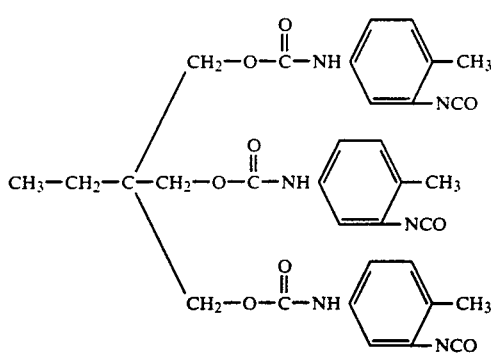

The solution contains 60% solids of the isocyanate and 40% methoxy propyl acetate as solvent. The prepolymer solution has an available NCO content of 10% by weight.

Prepolymer Solution B

Prepolymer Solution B is a solution of a blend of prepolymers which are the mixed reaction products of trimethylol propane and 1,3-butandiol with toluene diisocyanate (TDI). The reaction product structures are as follows.

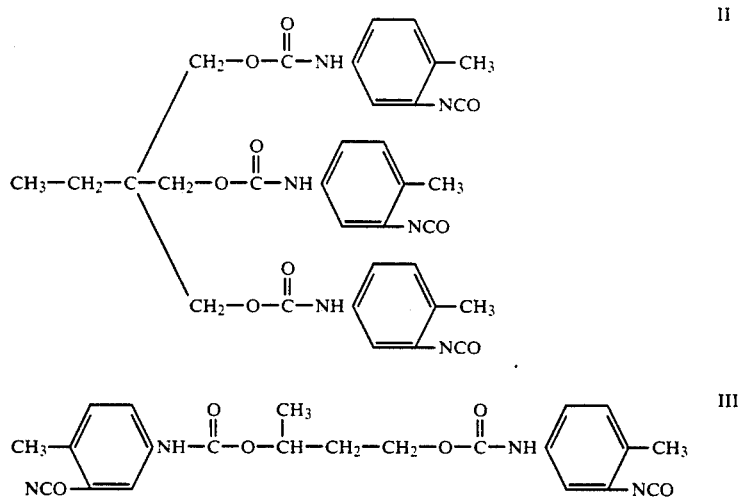

II

III

Prepolymer Solution B contains 75% solids as a blend of the two polyisocyanates at a molar ratio of II:III of 2:1, and 25% methyl ethyl ketone as solvent. The available NCO content is 12.5% by weight.

Prepolymer Solution C

Prepolymer Solution C is a solution of a blend of prepolymer reaction products of trimethoyl propane (TMP) and 1,3-butandiol with isophorone diisocyanate (IPDI). The reaction products have the following structures.

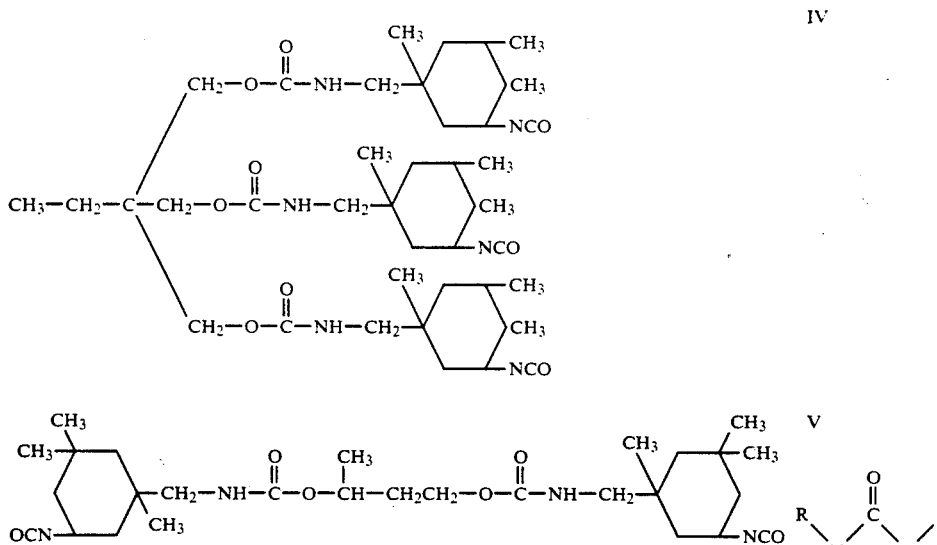

IV

V

Prepolymer Solution C contains 60% solids of the blend in a molar ratio of IV to V of 2.1:1, and 40% 50/50 methoxy propyl acetate/xylene as solvent. The available NCO content is 7.5% by weight.

Prepolymer Solution D

Prepolymer Solution D is the same as Prepolymer Solution C except the ratio of IV to V is 1.7:1, it has an available NCO of 8.8% by weight, and it contains 65% solids and 35% 50/50 methoxy propyl acetate/toluene as solvent.

Prepolymer Solution E

Prepolymer Solution E is a solution of a trimer of isophorone diisocyanate prepolymer, having the following formula.

VI

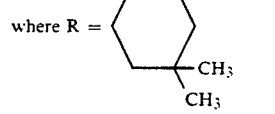

where R =

This solution had a solids content of 70% by weight, an NCO content of 10.2% by weight and 50/50 by weight methoxy propyl acetate/xylene solvent.

The prepolymers typically have relatively low molecular weights, i.e., from about 400 to about 800. The branched triisocyanate in the polymer structure plays an important role in controlling the degree of crosslinking in curing process. The diisocyanate prepolymer can be considered as a modifier that adds more linear chains to provide a more flexible coating.

The prepolymers used in the invention are preferably substantially free of the reactants such as unreacted toluene 2,4-diisocyanate and isophorone diisocyanate, which have a relatively high vapor pressure and may be somewhat toxic.

The epoxy silane compound is preferably sufficiently free of active hydrogen-containing functional groups which could cause premature gelation of the prepolymer when combined therewith. Thus, other epoxy silanes containing hydroxy, mercapto, amino, ureido functional groups are not suitable because they contain undesirable reactive groups. Preferably, the epoxy silane compound contains one or more alkoxy groups, e.g., methoxy or ethoxy, with methoxy groups being most preferred.

The epoxy silane is characterized by having a polymerizable (preferably terminal) epoxy group and a polymerizable silane group. These groups are connected by a linking moiety which is free of functional groups which will hydrolyze in the presence of the prepolymer. This linking moiety may be aliphatic or aromatic or be formed of both aliphatic and aromatic moieties. The linking moiety may contain nitrogen although it is preferably free of nitrogen atoms. The linking moiety may contain oxygen atoms which are typically within the molecule as ether linkages and most preferably are present only adjacent to the epoxy group. The linking moiety may be substituted, as is well known in the art, so long as the substitution does not greatly affect the ability of the epoxy-terminated silane to cross link the prepolymer. Example substituents which may be included in the linking moiety include $NO_2$, alkyl [e.g., $-CH_2(CH_2)_nCH_2-$ where n is from 0 to 20], alkoxy (e.g., methoxy), halogen, etc.

Preferred epoxy silanes useful in the practice of this invention are compounds of general formulae:

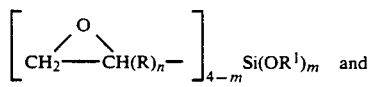  VII

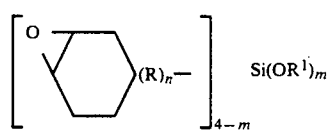  VIII where R is a divalent hydrocarbon radical (aliphatic, aromatic, or mixed aliphatic-aromatic containing) of less than 20 carbon atoms or a divalent radical of less than 20 carbon atoms consisting of carbon, nitrogen, sulfur and oxygen atoms, with the oxygen atoms present as ether linkages and with no two heteroatoms being adjacent within the backbone of the divalent hydrocarbon radical.

More preferred epoxy silanes are represented by the following formulae.

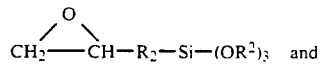 IX

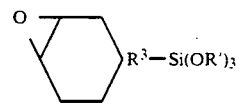 X wherein $R^3$ is a non-hydrolyzable divalent hydrocarbon radical of fewer than 20 carbon atoms or a divalent group of fewer than 20 carbon atoms and backbone of which is composed of only carbon, nitrogen, sulfur and oxygen atoms with no two adjacent heteroatoms, and $R^2$ is an aliphatic hydrocarbon group (e.g., alkyl) or acyl group of fewer than 10 carbon atoms.

In the epoxy silane compositions of formulae VII-X, n is from 0 to 1, m is 1 to 3, R may be any divalent hydrocarbon radical such as methylene, ethylene, decalene, phenylene, cyclohexylene, cyclopentylene, methylcyclohexylene, 2-ethylbutylene, and allene or an ether radical such as $-CH_2-CH_2-O-CH_2-CH_2-$, $-(CH_2CH_2O)_2-CH_2-CH_2-$, $-O-CH_2-CH_2-$, and $-CH_2O-(CH_2)_3-$. $R^1$ can be any aliphatic hydrocarbon radical of less than 10 carbon atoms such as methyl, ethyl, isopropyl, butyl, vinyl, alkyl, or any acyl radical of less than 10 carbon atoms such as formyl, acetyl, propionyl, or any radical of the formula $(CH_2CH_2O)_kZ$ in which k is an integer of at least 1, and Z is hydrogen.

The most preferred epoxy silanes are those represented by the formulae:

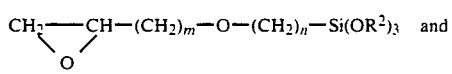 XI

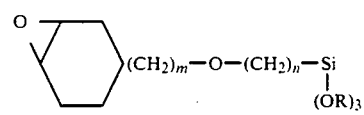 XII wherein R is an alkyl group of up to 6 carbon atoms, and m and n are independently 1 to 6.

Catalysts in the present invention are generally used in the amounts of from 0.01 to 5% by weight of the reactive ingredients in the curable composition. Preferably in the range of 0.05 to 1.0% by weight. The most preferably catalysts are dibutyl tin dilaurate and tin octoates. Other useful catalysts include triethylene diamine, dimethyl piperazine, bis[2-(N,N-dialkylamino)alkyl] ethers and dimorpholino dialkyl ethers, and other urethane-forming catalysts known to those skilled in the art.

Suitable solvents used in this invention are generally free of active hydrogen. Examples of useful solvents include ketones (such as acetone, methyl ethyl ketone, methyl isobutyl ketone, methyl isoamyl ketone), aromatics (such as benzene, toluene, and xylene), acetates (such as ethyl acetate, methoxy propyl acetate, dipropylene glycol methyl ether acetate),chlorinated solvents (such as 1,1,1 trichloroethane) and others such as nitromethane, nitroethane, ethylene carbonate, and propylene carbonate. The preferred solvents are methoxy propyl acetate, methyl isobutyl ketone, toluene and the blend of these. The range of solvent content can be from about 0 to about 95% by weight, depending upon different prepolymer and silane formulations used. The preferred solvent content is from 20 to about 80% by weight.

There are a number of different additives that may be incorporated into the coating composition of the invention for various purposes. A flattening agent such as fine silica or particulate organic material (e.g., made of polyethylene, polypropylene, or wax) may be used for conventional purposes to change the gloss and shine of the coating. Useful silica flattening agents are porous particulate materials with a pore volume of about 0.4 to 4.0 milligrams, and particle size of about 3 to 15 μm. The preferred weight percent of flattening agents in the composition is from 1.0% to 3.0% by weight depending on the gloss desired.

Other filler materials such as, $TiO_2$, $ZnS$, carbon black, and glass bubbles (such as those described in U.S. Pat. No. 3,365,315) may be added for reinforcement, to reduce density, and/or cost. The filled formulae provide sealant compositions to coat ceramic, glass, and cement.

Coloring agents, including organic dye and inorganic pigments, may be incorporated into the composition of the invention to form compositions which can stain and finish a substrate. These materials are, for example, metallic azo dyes, organic dyes (such as phthalocyanine dye and perylene dye) and inorganic pigments (such as ferric oxide and chromum yellow). The weight percent of such additives is preferably from 1% to about 90% of the total solids. Other conventional additives may also be added.

The coating composition is preferably packaged in conventional containers used for this purpose such as metal cans or containers made of high density polyethylene, nylon-coated polyethylene, polytetrafluoroethylene-coated polyethene, or in a sealed pouch made of a laminate of polyethylene and aluminum foil. The coating composition may include a suitable aerosol propellant and be packaged in a spray can, or in a conventional can for brush or "wipe on" application.

The compositions of the invention are cured by exposure to water, e.g., water vapor or moisture. Ambient humidity usually is adequate to promote cure. Heat or high humitidy will accelerate cure, and low temperatures (e.g., 5° C. or less) or low humidity (e.g., 15% R.H. or less) will retard cure.

Reference to the following examples will provide further understanding of the present invention. All parts are by weight, unless otherwise stated.

EXAMPLES 1–15

Examples 1–15 demonstrate the use of different prepolymers and silanes in a 1:1 molar ratio of available NCO in prepolymer to in the silanes in comparison with the use of prepolymers alone. The composition of Examples 1–15 is given in Table I. Curing time was recorded for 3 drops of a test formulation on glass surface until a tack-free condition was reached under ambient laboratory conditions.

The physical property testing was accomplished by the following procedures. Hardness was measured by ASTM Pencil Hardness Test D3363-74 (1980) to determine the degree of crosslinking and mar resistance.

Stain resistance involved the application of four different types of stain to the surface being tested. The types of stains were as follows:

(a) Blue-dyed ethanol-water solutions with an ethanol concentraion of 80%, 70%, and 60%, respectively, each solution containing 0.2% of a dye which is commercially available as Sandan Blue E-HRL (from Sandoz Colors and Chemicals).

(b) Fingernail polish commercially available from Revlon Inc, New York, N.Y. as BLAZE OF RED 55 and which was composed of a mixture of butylacetate, ethylacetate, toluene. isopropyl alcohol, resins and pigments.

(c) Marking pen commercially available as Berol Marker 8800 (red color), which contained a red coloring material dissolved in organic solvents.

(d) Shoe polish commercially available from KIWI as Black Liquid Wax which was thought to contain hydrocarbon solvent, resins and wax.

These household items were selected because they are common items which often cause staining problems. The stains were applied to the test coating which had been coated on a wood (e.g., maple, oak, etc.) block, after the test coating had dried. After being permitted to dry, the stains were removed by wiping with a cheese cloth soaked with acetone or fingernail polish remover. The surface condition of the test coating was then rated on a scale from 1 to 5, according to the following criteria:

1—coating was stripped during stain removal or stain penetrated deeply to coating;
2—coating was discolored or stain partially remains;
3—stain remained weakly visible in coating;
4—stain remained vaguely visible in coating; and
5—surface unchanged from condition prior to staining.

The heat resistance test envolved the use of a 2 ¾ inch (6.9 mm) diameter 3 inch (7.5 mm) high stainless steel cylinder weighing 5 lbs (2.27 kg) which was heated in oven at 152° C. for 15 minutes. The block was quickly removed from the oven and placed on its circular end onto a test coated surface which had previously been covered with one layer of cheese cloth, maintaining the cylinder on the surface for 30 minutes. After removal of the cylinder and cheese cloth, the coating was observed and rated from 1 to 5 according to the following criteria:

1—heavy discoloration and marking;
2—heavy discoloration or marking;
3—light discoloration and marking;
4—light discoloration or marking; and
5—no change from original surface.

Overall stain and heat resistance results, shown in Table II, reveal that coatings according to the invention which contain prepolymer and silane have better performance than coatings made with the prepolymer alone.

TABLE I

| | COMPOSITION (PARTS) | | | | | | | |
|---|---|---|---|---|---|---|---|---|
| | EXAMPLE NO. | | | | | | | |
| | 1 | 2 | 3 | 4 | 5 | 6 | 7 | 8 |
| Prepolymer A[1] | 50 | 50 | 50 | | | | | |
| Prepolymer B | | | | 50 | 50 | 50 | | |

TABLE I-continued

COMPOSITION (PARTS)

|  |  |  |  |  |  |  | | |
|---|---|---|---|---|---|---|---|---|
| Prepolymer C |  |  |  |  |  |  | 50 | 50 |
| Prepolymer D |  |  |  |  |  |  |  |  |
| Prepolymer E |  |  |  |  |  |  |  |  |
| γ-glycydoxylpropyl trimethoxysilane |  | 17 |  |  | 26.4 |  |  | 12.7 |
| β-(3,4-epoxycyclohexyl) ethyltrimethoxysilane |  |  | 16 |  |  | 25.3 |  |  |
| Dibutyltin dilaurate | 0.2 | 0.2 | 0.2 | 0.2 | 0.2 | 0.2 | 0.2 | 0.2 |
| 25/75 MIBK²/toluene | 50 | 50 | 50 | 50 | 50 | 50 | 50 | 50 |
| Molar ratio NCO in prepolymer/ silane | — | 1.0 | 1.0 | — | 1.0 | 1.0 | — | 1.0 |
| Curing time (mins) | 110 | 100 | 100 | 160 | 140 | 140 | 180 | 180 |

| | EXAMPLE NO. | | | | | | |
|---|---|---|---|---|---|---|---|
| | 9 | 10 | 11 | 12 | 13 | 14 | 15 |
| Prepolymer A¹ |  |  |  |  |  |  |  |
| Prepolymer B |  |  |  |  |  |  |  |
| Prepolymer C | 50 |  |  |  |  |  |  |
| Prepolymer D |  | 50 | 50 | 50 |  |  |  |
| Prepolymer E |  |  |  |  | 50 | 50 | 50 |
| γ-glycydoxylpropyl trimethoxysilane |  |  | 16.6 |  |  | 23.7 |  |
| β-(3,4-epoxycyclohexyl) ethyltrimethoxysilane | 12.2 |  |  | 16 |  |  | 22.7 |
| Dibutyltin dilaurate | 0.2 | 0.2 | 0.2 | 0.2 | 0.2 | 0.2 | 0.2 |
| 25/75 MIBK²/toluene | 50 | 50 | 50 | 50 | 50 | 50 | 50 |
| Molar ratio NCO in prepolymer/ silane | 1.0 | — | 1.0 | 1.0 | — | 1.0 | 1.0 |
| Curing time (mins) | 180 | 110 | 100 | 100 | 150 | 150 | 180 |

Footnotes:
¹Prepolymer designations refer to previously described prepolymer solutions.
²Methyl isobutyl ketone

TABLE II

PHYSICAL PROPERTIES¹

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| PENCIL HARDNESS | | | | | | | | | | | | | | | |
| 16 Hours | <H | 2H | 2H | <H | 1-2H | 2-3H | H | 1-2H | H | >H | H | 2H | >H | H | H |
| 1 Week | 2H | 4-5H | 4-5H | H | 4H | 4H | 3H | 4H | 4H | >H | 3H | 4H | >H | 3H | 3H |
| STAIN RESISTANCE RATING | | | | | | | | | | | | | | | |
| C₂H₅OH resistance | | | | | | | | | | | | | | | |
| 80% | 3.0 | 5.0 | 4.5 | 1.0 | 5.0 | 5.0 | 1.0 | 3.0 | 3.0 | 1.0 | 5.0 | 4.0 | 1.0 | 3.0 | 4.0 |
| 70% | 3.5 | 5.0 | 4.5 | 1.0 | 5.0 | 5.0 | 1.0 | 3.0 | 3.0 | 1.0 | 3.5 | 4.0 | 1.0 | 3.5 | 5.0 |
| 60% | 4.0 | 5.0 | 5.0 | 1.0 | 5.0 | 5.0 | 1.0 | 3.0 | 3.0 | 1.0 | 3.5 | 3.5 | 1.0 | 3.5 | 5.0 |
| Fingernail Polish | 3.0 | 5.0 | 4.0 | 1.0 | 5.0 | 4.5 | 1.0 | 5.0 | 5.0 | 1.0 | 5.0 | 4.0 | 1.0 | 3.5 | 3.5 |
| Permanent Marker | 3.0 | 5.0 | 4.0 | 1.0 | 5.0 | 4.0 | 2.0 | 5.0 | 5.0 | 1.0 | 5.0 | 4.0 | 1.0 | 5.0 | 4.0 |
| Shoe Polish | 2.0 | 4.0 | 5.0 | 1.0 | 5.0 | 5.0 | 3.5 | 4.0 | 4.0 | 1.0 | 5.0 | 5.0 | 3.0 | 4.0 | 5.0 |
| HEAT RESISTANCE RATING | | | | | | | | | | | | | | | |
| 5-6 days after coating | 1 | 4 | 4 | 4 | 4 | 5 | 2 | 3 | 3 | 2 | 4 | 4 | 1 | 3 | 4 |

Footnotes:
¹all coatings applied to a laminated veneer oak panel, two counts by brush, to provide a dry thickness of about 50 to about 90 micrometers.

EXAMPLE 16

This example demonstrates the chemical stability of the one-component, moisture-curable composition according to the invention. A coating formulation was prepared using 63 parts of Prepolymer Solution A, 21 parts of gamma-glycydoxy propyl trimethoxysilane, 63 parts of toluene, and 0.25 part of dibutyltin dilaurate. The solution was divided into two parts. One part was kept as a control and the other part was aged by heating at 60° C. for 72 hours. Both samples were analyzed by nuclear magnetic resonance spectrometry and infrared spectrometry and found to have the same molar ratio of active ingredients.

EXAMPLES 17-26

Comparative Examples 17-26, described in Table III, were prepared to demonstrate the useful range of the two active ingredients used in terms of weight ratio and molar ratio. The test data shown in Table IV shows that optimum performance is at a 1/1 molar ratio and 3/1 weight ratio of prepolymer to silane, and that the preferred range is from 10/1.0 to 1.0/1.0 (weight ratio) and from 3.37/1.0 to 0.34/1.0 (molar ratio).

TABLE III

COMPOSITION (PARTS)

| | Example No. | | | | | | | | | |
|---|---|---|---|---|---|---|---|---|---|---|
| | 17 | 18 | 19 | 20 | 21 | 22 | 23 | 24 | 25 | 26 |
| Prepolymer A[1] | 42.78 | 42.78 | 42.78 | 42.78 | 42.78 | 42.78 | 42.78 | 42.78 | 42.78 | 39.94 |
| γ-glycidoxypropyl trimethoxysilane | — | 4.28 | 5.35 | 6.03 | 8.56 | 10.70 | 14.26 | 21.39 | 42.78 | 59.90 |
| Dibutylin Dilaurate | 0.17 | 0.17 | 0.17 | 0.17 | 0.17 | 0.17 | 0.17 | 0.17 | 0.17 | 0.17 |
| 25/75 (MIBK[2]/toluene) | 57.05 | 52.77 | 51.7 | 49.92 | 48.49 | 46.35 | 42.78 | 18.83 | 14.27 | — |
| Wt Ratio Prepolymer/Silane | 10/0 | 10/1 | 8/1 | 6/1 | 5/1 | 4/1 | 3/1 | 2/1 | 1/1 | 1/1.5 |
| Molar Ratio NCO/Silane | 10/0 | 3.37/1 | 2.7/1 | 2.0/1 | 1.69/1 | 1.35/1 | 1.0/1.0 | 0.675/1.0 | 0.34/1.0 | 0.23/1.0 |
| Curing time (mins) | 240 | 150 | 150 | 120 | 120 | 120 | 120 | 120 | 360 | 360 |

Footnotes:
[1] Prepolymer designations refer to previously described prepolymer solutions.
[2] Methyl isobutyl ketone

TABLE IV

PHYSICAL PROPERTIES

| | Example No. | | | | | | | | | |
|---|---|---|---|---|---|---|---|---|---|---|
| | 17 | 18 | 19 | 20 | 21 | 22 | 23 | 24 | 25 | 26 |
| PENCIL HARDNESS | | | | | | | | | | |
| 24 Hours | <H | H | 2H | 2H | 2H | 3H | 3H | 3H | <H | <H |
| 1 Week | 2H | 3H | 4H | 4H | 5H | 5H | 6H | 3H | H | <H |
| STAIN RESISTANCE RATING | | | | | | | | | | |
| $C_2H_5OH$ Resistance[1,2] | | | | | | | | | | |
| 80% | 4.0; 2.5 | 3.5; 3.5 | 3.5; 4.5 | 4.0; 5.0 | 2.5; 5.0 | 3.0; 4.5 | 5.0; 5.0 | 5.0; 5.0 | 3.5; 4.0 | 2.0; 2.0 |
| 70% | 3.0; 3.0 | 4.0; 3.5 | 3.0; 3.5 | 4.5; 4.5 | 4.0; 5.0 | 3.0; 5.0 | 5.0; 5.0 | 5.0; 5.0 | 4.0; 4.5 | 2.0; 3.0 |
| 60% | 3.5; 3.0 | 4.5; 3.5 | 4.0; 3.5 | 5.0; 5.0 | 5.0; 5.0 | 5.0; 5.0 | 5.0; 5.0 | 5.0; 5.0 | 5.0; 4.5 | 1.5; 2.0 |
| Fingernail Polish[1,2] | 3.0; 4.0 | 4.5; 3.0 | 5.0; 4.0 | 5.0; 5.0 | 5.0; 5.0 | 4.0; 5.0 | 5.0; 5.0 | 4.5; 4.5 | 5.0; 4.5 | 4.0; 4.0 |
| Permanent Marking[1,2] | 3.5; 1.5 | 3.5; 1.5 | 3.0; 2.0 | 4.0; 5.0 | 3.0; 4.5 | 4.0; 4.0 | 5.0; 5.0 | 4.5; 4.5 | 3.4; 3.5 | 2.0; 3.0 |
| Black shoe polish[2,3] | 4.0; 3.0 | 4.0; 2.0 | 4.5; 4.5 | 4.5; 5.0 | 4.5; 4.5 | 5.0; 4.5 | 5.0; 5.0 | 5.0; 4.0 | 3.5; 4.0 | 3.0; 3.0 |
| Heat resistance[1] | 3.5 | 3.5 | 5.0 | 5.0 | 5.0 | 5.0 | 5.0 | 5.0 | 3.0 | 2.0 |

Footnotes:
[1] coating applied to maple solid wood panels, two coats with a brush, to provide a dry coating thickness of about 75 ± 5 micrometers.
[2] coating applied to laminated veneer oak panels, two coats with a brush, to provide a dry coating thickness of about 50 to 90 micrometers. When Footnotes 1 and 2 are shown together, this means that, with respect to the number pair given for each example, the first footnote applies only to the first listed number and the second footnote applies to the second listed number.
[3] first listed number refers to results obtained by removal of stains by conventional acetone or fingernail polish remover, and second listed number refers to results obtained by removal of stains with mineral spirits.

EXAMPLE 27

This example compares the performance of commercially available coating products with the coating of Example 3, a coating composition of the invention. The penetration is determined by two factors—"spread" and "absorption". Spread is the ability of a one ml volume of a test coating composition to spread on a pine surface before it dries. Absorption measures the height of a test coating carried vertically up an oak column (1 inch in diameter) 10 seconds after the column is placed endwise in a container of the test coating composition. The larger the spread area and the higher the height reached on the column, the better the penetration into wood. The product of the invention was found to be superior to the commercially available products in all categories. The comparison of properties is shown in Table V.

TABLE V

| Coating Composition Type (Supplier) | Solids % | Time to Dry to Recoat (min.) | Pencil Hardness | Stain Rating | | | | | Heat Resistance Rating | Penetration | |
|---|---|---|---|---|---|---|---|---|---|---|---|
| | | | | Alcohol 90% | 80% | Fingernail Polish | Permanent marker | Shoe polish | | spread (sq. in.) | absorbtion (in.) |
| Nitrocellulose (Lilly) | 44 | 2 | 2-3H | 2.0 | 2.0 | 1.0 | 1.0 | 1.0 | 1.0 | 1.5 | 1/8 |
| Nitrocellulose (Sherwin Williams) | 38 | 2 | 2-3H | 2.5 | 3.0 | 1.0 | 1.0 | 2.0 | 2.0 | 1.25 | 1/16 |
| Tung oil (Hope) | 100 | 48 | <H | 3.5 | 4.0 | 2.0 | 1.0 | 3.0 | 2.0 | 11.25 | 3/8 |
| Alkyl varnish (Homer Formby) | 23 | 12 | H | 2.0 | 2.5 | 3.5 | 1.0 | 1.0 | 4.0 | 6.25 | 1/4 |
| Alkyl urethane (Homer Formby) | 21 | 12 | H | 2.0 | 2.0 | 4.0 | 1.0 | 1.0 | 4.0 | 8.75 | 1/4 |
| Shallac (Bulls Eye) | 30 | 24 | H | 1.0 | 1.0 | 1.0 | 1.0 | 1.0 | 1.0 | 2.25 | 1/16 |
| Urethane, glass (Minwax) | 45 | >8 | H | 1.0 | 1.0 | 2.0 | 2.0 | 1.0 | 2.0 | 7.50 | 1/4 |
| Urethane, satin (Minwax) | 42 | >8 | H | 3.0 | 3.0 | 3.0 | 3.0 | 2.0 | 1.0 | 5.75 | 1/4 |
| Urethane, gloss (DEFT) | 55 | 6 | H | 4.5 | 4.5 | 3.0 | 1.0 | 1.0 | 1.0 | 2.75 | 1/16 |
| Urethane, satin (DEFT) | 55 | 6 | H | 3.5 | 3.5 | 1.0 | 1.0 | 1.0 | 4.0 | 3.0 | 1/16 |
| Urethane, gloss (McClosky) | 42 | 8-24 | H | 4.5 | 4.5 | 1.0 | 1.0 | 1.0 | 1.0 | 3.0 | 1/16 |
| Urethane, satin (McClosky) | 38 | 8-24 | <H | 4.5 | 4.5 | 1.0 | 4.0 | 1.0 | 1.0 | 3.25 | 1/16 |
| Urethane (Red Devil) | 20 | 24 | 3H | 3.5 | 3.5 | 2.0 | 2.0 | 4.0 | 3 | 2.5 | 1/4 |
| Urethane, (Woodsman) | 23 | 24 | H | 4.0 | 4.0 | 2.0 | 2.0 | 4.0 | 4 | 3.0 | 1/4 |
| Example 3 | 40 | 2-3 | 4H | 5.0 | 5.0 | 5.0 | 5.0 | 5.0 | 5.0 | 12.0 | 1½ |

EXAMPLES 28-31

Examples 28-31 show the use of different additives incorporated into coating formulations according to the invention for different purposes.

| Ingredients (Parts) | Example No. | | | |
|---|---|---|---|---|
| | 28 | 29 | 30 | 31 |
| Prepolymer Solution A | 63 | 63 | 63 | 63 |
| gamma-glycydoxy propyl trimethoxysilane | 31.5 | 63 | 21 | 21 |
| dibutyltin dilaurate | 0.2 | 0.2 | 0.25 | 0.25 |
| 25/75 (MIBK/toluene) | — | — | 63 | 63 |
| ZnS | 30 | | | |
| TiO$_2$ | | 40 | | |
| Silica HP-200 | | | 4.5 | |
| Silica HP-210 | | | | 4.5 |

HP-200 and HP-210 are the manufacturer's designations for silica fillers which are available from Crossfield Chemicals in Pittsburgh, Pa.

Formula 28 and 29 are filled compositions that can be applied as grout to cement block. The cured compositions exhibit excellent bonding and adhesion to ceramic and concrete surfaces, providing excellent abrasion resistance and moisture resistance. The filled composition may be employed as grout for ceramic tile or as a waterproof coating for basement walls and floors.

Examples 30 and 31 provide compositions which include silica filler to reduce gloss from an initial reading of about 80 to 90 gloss units to about 30 to 35 units as determined using Gardner glossmeter at a 60° angle.

EXAMPLES 32-35

Examples 32-35 demonstrate coating compositions of the invention which include coloring agents. Examples 32 and 34 are formulations which provide a "gloss" finish while Examples 33 and 35 provide a "satin" finish.

TABLE VI

| Example No. | Composition (Parts) | | | |
|---|---|---|---|---|
| | 32 | 33 | 34 | 35 |
| Prepolymer A | 30.02 | 30.03 | 29.66 | 29.66 |
| Gamma-glycidoxy-propyltrimethoxy silane | 4.75 | 4.75 | 4.69 | 4.69 |
| Dibutyltin dilaurate | 0.07 | 0.10 | 0.07 | 0.10 |
| Precipitated silica flattening agent | — | 1.50 | — | 1.50 |
| Dye (Pylam Corp. Pylakrome TM maple dye) | 0.25 | 0.25 | — | — |
| Dye pigment dispersion (Hilton-Davis Corp. maple) | — | — | 1.5 | 1.5 |
| Para-toluene sulfonyl isocyanate | <0.50 | <1.00 | <0.50 | <1.00 |
| Methyl isoamyl ketone | 16.24 | 16.24 | 16.04 | 16.04 |
| Trimethyl benzene (40%), xylene (9%), cumene (3%), aromatic distillate residue (balance of 100%) solvent blend (Hi-Sol TM) | 48.67 | 47.14 | 48.04 | 46.51 |

Examples 32-35 and two commercially available colored surface coating compositions (Polyshade TM commercially available from Minwax Corporation and Polyurestain TM commercially available from McClosky Corporation) were used to finish the 2×12 inch face of a ¼×2×12 inch solid block of oak which had been sanded with 200 grit sandpaper with results as shown in Table VII.

TABLE VII

| | Ex. 32 | Ex. 33 | Ex. 34 | Ex. 35 | Minwax TM Polyshade | McClosky Polyurestain TM |
|---|---|---|---|---|---|---|
| Formula Compatibility | excellent | excellent | excellent | excellent | — | — |
| Viscosity (Brookfield) | 5 | 5 | 4.5 | 4.5 | 116 | 87 |
| Coatability (Wipe-on) | better | better | better | better | good | good |
| Color Control | better | better | better | better | good | good |
| Penetration Into Wood | yes | yes | yes | yes | no | no |
| Clarity/Highlight Grain | better | better | better | better | fair-poor | fair-poor |
| Ease of Mixing | easy | easy | easy | easy | difficult | difficult |
| Coating Hardness | 5H | 5H | 4H | 4H | H | H |

Formula Compatibility is a measure of whether or not there are observable adverse changes in the coating composition such as changes in color shade or shelf life.
Viscosity is measured by use of a Brookfield viscometer under ambient conditions with a No. 1 spindle rotated at 100 rpm.
Coatability is an observation of whether or not the composition coats easily, quickly and in a controlled manner.
Color Control is an observation as to whether or not the composition can be easily formulated to obtain a desired color and shade.
Clarity/Highlight Grain is an observation of the relative grain highlights of the coating composition.
Penetration is an observation under magnification of the relative degree of penetration of the coating composition into a split block of wood.
Ease of Mixing is an observation of the relative ease of obtaining a homogeneous mixture.

The coatings of Examples 32-35 and the two commercially colored coating compositions were subjected to the tests described above to determine their stain and mark resistance. Results are shown in Table VIII.

TABLE VIII

| Coating Stain Resistance | Ex. 32 | Ex. 33 | Ex. 34 | Ex. 35 | Minwax Polyshade TM | McClosky Polyurestain TM |
|---|---|---|---|---|---|---|
| Iodine | 5 | 5 | 4 | 4 | 2 | 2 |
| Merthiolate | 5 | 5 | 4 | 4 | 3 | 3 |
| Shoe Polish | 5 | 5 | 5 | 5 | 3 | 4 |
| Acetone | 4 | 4 | 5 | 5 | 4 | 4 |
| EtOH (50%) | 5 | 5 | 5 | 5 | 4 | 4 |
| IPA (70%) | 5 | 5 | 5 | 5 | 4 | 4 |
| Heat Resistance (150° C.) | ND | ND | ND | ND | ND | ND |

ND = No Damage

While this invention has been described in terms of specific embodiments, it should be understood that it is capable of further modifications. The claims herein are intended to cover those variations which one skilled in the art would recognize as the chemical equivalent of what has been described here.

I claim:

1. An article comprising a substrate treated with a cured moisture-curable composition consisting essentially of triisocyanate prepolymer and an amount of epoxy silane sufficient to crosslink said prepolymer, said epoxy silane compound being sufficiently free of active hydrogen-containing functional groups to avoid premature gelation of the prepolymer when combined therewith.

2. The article of claim 1 wherein the substrate is wood.

3. The article of claim 1 wherein said triisocyanate prepolymer is the reaction product of a diisocyanate with a member selected from the group consisting of a triol and 1,3,5-triazine.

4. The article of claim 3 also including sufficient diisocyanate prepolymer to improve flexibility of the cured composition.

5. The article of claim 3 wherein said diisocyanate is selected from the group consisting of aromatic and aliphatic diisocyanates.

6. The article of claim 1 wherein said epoxy silane is selected from the group consisting of gammaglycidoxypropyl-trimethoxy silane and beta-(3,4-epoxycyclohexyl) ethyltrimethoxy silane.

7. The article of claim 1 wherein said coating also includes sufficient flattening agent to reduce gloss.

8. The article of claim 1 wherein said coating also includes a coloring agent.

* * * * *

UNITED STATES PATENT AND TRADEMARK OFFICE
CERTIFICATE OF CORRECTION

PATENT NO. : 5,124,210

DATED : June 23, 1992

INVENTOR(S) : James J. J. Fong

It is certified that error appears in the above-identified patent and that said Letters Patent is hereby corrected as shown below:

In the Abstract [57], "mositure-curable" should read --moisture-curable--

Col. 8, line 35  "Si(OR$^2$)$_3$" should read --Si(OR)$_3$--

Signed and Sealed this

Fourteenth Day of September, 1993

*Attest:*

BRUCE LEHMAN

*Attesting Officer*   *Commissioner of Patents and Trademarks*